Patented Nov. 22, 1949

2,488,981

UNITED STATES PATENT OFFICE 2,488,981

PROCESS FOR THE PRODUCTION OF FURFURAL FROM VEGETABLES

Ettore Marchiaro, Rino Mostardini, and Giuseppe Orzalesi, Colleferro, Italy, assignors to Bombrini Parodi-Delfino-Societa per Azioni, Rome, Italy, a company of Italy No Drawing. Application May 19, 1947, Serial No. 749,090. In Italy November 22, 1946

2 Claims. (Cl. 260—347)

A process for obtaining furfural, acetic acid, methyl acetate, acetone, carbohydrates and other products by treating wood and other matters derived from vegetables generally with steam and other volatile agents.

It is known that by treating wood and other materials derived from vegetables with mineral acids numerous chemical substances of notable interest may be obtained such as furfural, acetic acid, acetone, etc. Processes are known which carry out the treatment by means of volatile inorganic acids and steam.

The object of the present invention is a process by which the same products may be obtained from the same raw materials by a treatment with steam and volatile substances not having an acid character per se but susceptible of giving rise to the formation of acids under the conditions in which the treatment is carried out.

The present invention thus differs from other inventions known in the prior art because hydrolysis and other reactions which occur, giving rise to the formation of interesting products, are not caused by the introduction of acids from outside into the apparatus, but by the use of the acids which are formed inside the apparatus owing to the transformation of the volatile substances of a non-acid character introduced.

The process has the advantage of being in many cases notably simple and more economical than other processes characterized by the use of acids.

The treatment is carried out by introducing the material to be treated in suitable extractors and introducing the selected volatile substance and saturated or superheated steam into these extractors.

As convenient materials for this treatment may be mentioned, by way of example, wood of any kind, sawdust, straw, rice husk, oat chaff, exhausted olive husks, grits and corn bran, maize cores and stalks, flax stalks, sorghum stalks; practically many materials of vegetable origin may be used as raw material to be submitted to this treatment.

As volatile agents for use conjunctly with steam for carrying out the process may be mentioned, by way of example, chlorine, bromine, carbon oxychloride, thyonil and sulfuryl chlorides, volatile organic acid chlorides, etc.

The treatment may be carried out using either only one of the volatile agents mentioned above, or a mixture of these in any varying proportion.

The treatment may be carried out using the volatile agent in a widely varying range of concentrations relative to the steam; it is however convenient to use quantities at least above the 0.5% by weight, while even much stronger concentrations may be usefully employed.

The concentration and choice of the volatile agent are in dependence of the products to be obtained by the treatment and of the raw material employed, as also of the apparatus with which the treatment is to be performed.

The treatment may be applied with saturated or superheated steam and with or without the provision of heat from outside.

The material to be treated may be previously dried and preheated, or it may be introduced in a damp and cold condition.

By varying conveniently the choice and concentration of the volatile agent as well as the other conditions of the process, there may be thus realized three different kinds of process:

(a) Arrangements may be made for partially condensing the steam introduced into the extractors simultaneously with the volatile agent in one or more zones of the extraction apparatus itself, and in this case the action on the material is brought forth partly in the vapour phase and partly in the liquid phase.

(b) Arrangements may be made for heat to develop within the extractors, during the extraction, to a sufficient extent for maintaining the temperature at such a level as to make it impossible for liquids to be formed within the extracting apparatus; in this case the action on the material is brought forth in the vapour phase only.

(c) Arrangements at last may be made so that the extraction occurs also completely in the vapour phase, as in case (b), but independently of the development of heat within the apparatus, by a convenient choice of the temperature of the vapour at its entrance and of its amount, or by providing the required amount of heat from without.

The temperature for treatment may vary within a very wide range; for particular objects it is possible to operate at notably low temperature, and in this case it is also advisable to operate simultaneously under reduced pressure; in other cases, according to the products which it is desired to obtain in larger quantity, temperatures even above 200° C. may be used, while in other cases the most convenient temperatures are comprised between 100° and 150° C.

The pressure within the extracting apparatus may be maintained equal to atmospheric pressure, but in some cases it may be convenient to operate, as indicated above, under reduced pressure or even under pressure appreciably higher than the atmospheric pressure.

The operation may be performed discontinuously with a single extraction apparatus or with many extraction apparatus in series or in battery. It is however more convenient to operate continuously because in this case in addition to excellent extraction yields may easily be coupled high concentrations of the products of treatment in the extracts, and correspondingly low requirement of steam, and strong potentialities, even though apparatus of small capacity and simple construction be employed.

For continuous operation, by way of example, the material for treatment may be introduced continuously from the top of a tower; and the treated material is extracted continuously from the bottom; the steam and the volatile agent follow whereas the opposite path.

By way of example of industrial working conditions, the following examples may be mentioned:

Example 1

Treated material:
 Milled and dried maize cores.
Volatile agent:
 Chlorine gas, in 3% concentration in the steam.
Amount of steam:
 70 kg. per 100 kg. of treated material.
Continuous industrial counterflow extraction apparatus.
Composition of the extract:

| | Per cent |
|---|---|
| Furfural | 14 |
| Acetic acid | 8 |
| Other products | 3 |
| Water | 75 |

Example 2

Treated material:
 Milled and partially dried maize cores.
Volatile agent:
 Chlorine gas, in 2% concentration in the steam.
Amount of steam:
 100 kg. per 100 kg. of treated material.
Continuous industrial counterflow extraction apparatus.
Composition of the extract:

| | Per cent |
|---|---|
| Furfural | 12.5 |
| Acetic acid | 6 |
| Other products | 3 |
| Water | 78.5 |

Example 3

Treated material:
 Dried oak-wood saw-dust.
Volatile agent:
 Chlorine gas in 5% concentration in the steam.
Amount of steam:
 70 kg. per 100 kg. of treated material.
Continuous industrial counterflow extraction apparatus.
Composition of the extract:

| | Per cent |
|---|---|
| Furfural | 9 |
| Acetic acid | 11 |
| Other products | 4 |
| Water | 76 |

Example 4

Treated material:
 Partially dried oak-wood saw-dust.
Volatile agent:
 Chlorine gas, in 8% concentration in the steam.
Amount of steam:
 70 kg. per 100 kg. of treated material.
Continuous industrial counterflow extraction apparatus.
Composition of the extract:

| | Per cent |
|---|---|
| Furfural | 8 |
| Acetic acid | 15 |
| Other products | 4 |
| Water | 73 |

The extraction yield varies of course in dependence of the treated material and of the reaction conditions; the total extracted volatile substances may afford yields varying from 10 to 30% of the treated material.

The products of the treatment may of course be fractionated and isolated in different ways. Thus it is possible to condense through convenient treatments all the condensable products contained in the vapours issuing from the treating apparatus and subsequently to operate the fractionation of the liquid products obtained.

It is possible to operate more advantageously by fractionatedly cooling and/or washing with various chemical reagents the vapours issuing from the treating apparatus. By way of example, where chlorine gas is used as volatile agent, the vapours issuing from the treating apparatus may first of all be cooled to a temperature slightly above 100° C., thus producing by condensation a certain amount of hydrochloric acid in the condition of an aqueous solution. The vapours may be subsequently washed by water falling from above at boiling temperature in a tower containing limestone in small blocks; the last portions of hydrochloric and acetic acids are thus removed in the condition of calciumchloride and calcium acetate respectively, while the vapours issuing from the limestone tower may subsequently be conveyed to distillation columns where furfural, methyl alcohol, etc. are separated.

It is apparent that in dependence of the raw material treated, of the volatile agent employed and of the conditions of the treatment, the method of isolating the various reaction products may be widely varied without implying any substantial variation in the process.

The solid materials obtained in discharging the extracting apparatus have various characteristics in dependence of the treatment applied. In particular conditions it is possible to extract a dry carbonaceous product containing small amounts of carbohydrates which, when subjected to subsequent simple treatments and to thorough washing, have excellent discolouring properties and may be used as active carbon.

On the other hand, in different conditions, by way of example, the material may have a dark brown colour and a certain wet content and a notable fermentable carbohydrates content; in this case, it may be extracted with water and the sugar solutions obtained may be used as a raw material in the preparation of fermentation products.

Our process has many important characteristics which make it very interesting as compared with previous processes for the extraction of chemical products from vegetable raw materials.

Thus it permits, by way of example, the ready use of the most different raw materials by using always the same apparatus. Also by conveniently varying the quality of the volatile agent and the conditions of treatment it is possible to obtain a wide variety of products from the treatment.

Another interesting feature is that the volatile products obtainable by the treatment may be extracted at a high overall concentration, so that the isolation and purification operations are generally very economical.

We claim:

1. A process for the production of furfural from vegetable materials comprising subjecting vegetable material to the action of dry steam containing dry gaseous chlorine in a concentration of 0.5 to 8% by weight, at a temperature of about 100 to 200° C. in a steam-to-material-being-treated ratio of 70 to 100% by weight.

2. A process for the production of furfural from vegetable materials comprising subjecting vegetable material to the action of dry steam containing dry gaseous chlorine in a concentration of 3% by weight, at a temperature between 100 and 150° C., at a super-atmospheric pressure and in a steam-to-material-being-treated ratio of about 100% by weight.

ETTORE MARCHIARO.
MOSTARDINI, RINO.
GIUSEPPE ORZALESI.

REFERENCES CITED

The following references are of record in the file of this patent:

UNITED STATES PATENTS

| Number | Name | Date |
|---|---|---|
| 763,472 | Ewen et al. | June 28, 1904 |
| 2,008,006 | Classen | July 16, 1935 |
| 2,140,572 | Brownlee | Dec. 20, 1938 |

FOREIGN PATENTS

| Number | Country | Date |
|---|---|---|
| 14,938 of 1913 | Great Britain | April 1913 |
| 142,480 | Great Britain | Apr. 21, 1921 |